(12) United States Patent
Mondragon et al.

(10) Patent No.: US 9,060,202 B2
(45) Date of Patent: Jun. 16, 2015

(54) CONTROLLING DISPLAY OF CONTENT ON NETWORKED PASSENGER CONTROLLERS AND VIDEO DISPLAY UNITS

(75) Inventors: Christopher K. Mondragon, Laguna Niguel, CA (US); Brett Bleacher, Rancho Santa Margarita, CA (US); John J. Daly, Irvine, CA (US); David Pook, Lake Forrest, CA (US)

(73) Assignee: Thales Avionics, Inc., Irvine, CA (US)

( * ) Notice: Subject to any disclaimer, the term of this patent is extended or adjusted under 35 U.S.C. 154(b) by 67 days.

(21) Appl. No.: 13/328,224

(22) Filed: Dec. 16, 2011

(65) Prior Publication Data

US 2012/0174165 A1 Jul. 5, 2012

Related U.S. Application Data

(60) Provisional application No. 61/427,871, filed on Dec. 29, 2010.

(51) Int. Cl.
*H04N 7/18* (2006.01)
*H04N 21/478* (2011.01)
*H04N 21/214* (2011.01)
*H04N 21/41* (2011.01)
*H04N 21/4185* (2011.01)
*H04N 21/4786* (2011.01)

(52) U.S. Cl.
CPC ..... *H04N 21/47815* (2013.01); *H04N 21/2146* (2013.01); *H04N 21/4126* (2013.01); *H04N 21/4185* (2013.01); *H04N 21/4781* (2013.01); *H04N 21/4786* (2013.01)

(58) Field of Classification Search
CPC .......... H04N 21/4126; H04N 21/4781; H04N 21/2146; H04N 21/43615
USPC .............. 725/80–81, 75–76; 348/734
See application file for complete search history.

(56) References Cited

U.S. PATENT DOCUMENTS

| 6,147,980 | A  | 11/2000 | Yee et al.  |
| 6,499,027 | B1 | 12/2002 | Weinberger  |

(Continued)

FOREIGN PATENT DOCUMENTS

WO    WO 98/44400 A2    10/1998

OTHER PUBLICATIONS

International Search Report and Written Opinion of the International Searching Authority, PCT International Application No. PCT/US2011/065437, Mar. 7, 2012.

(Continued)

*Primary Examiner* — Benjamin R Bruckart
*Assistant Examiner* — Aklil Tesfaye
(74) *Attorney, Agent, or Firm* — Myers Bigel Sibley & Sajovec, P.A.

(57) ABSTRACT

A controller is disclosed that controls an entertainment system which includes a video display unit that is separate from the controller. The controller includes a network interface, a display device, and a processing device. The network interface communicates with the video display unit via at least one data network. The processing device communicates a first command over the at least one data network to control a display of first content on the video display unit, and controls a display of second content on the display device of the controller. The second content is displayed concurrently with the first content. Related entertainment systems are disclosed.

12 Claims, 8 Drawing Sheets

(56) References Cited

U.S. PATENT DOCUMENTS

| | | | |
|---|---|---|---|
| 6,928,654 B2* | 8/2005 | Tranchina et al. | 725/75 |
| 7,809,333 B2 | 10/2010 | Jougit | |
| 7,840,991 B2* | 11/2010 | Dusenberry et al. | 725/153 |
| 8,677,423 B2* | 3/2014 | Hicks et al. | 725/78 |
| 2005/0273823 A1 | 12/2005 | Brady, Jr. et al. | |
| 2006/0143662 A1* | 6/2006 | Easterling et al. | 725/76 |
| 2006/0238301 A1* | 10/2006 | Wu et al. | 340/10.1 |
| 2007/0124765 A1* | 5/2007 | Bennett et al. | 725/38 |
| 2007/0135046 A1 | 6/2007 | Kapur et al. | |
| 2007/0157285 A1* | 7/2007 | Frank et al. | 725/138 |
| 2007/0250872 A1* | 10/2007 | Dua | 725/81 |
| 2007/0288969 A1* | 12/2007 | Prum | 725/81 |
| 2008/0057868 A1* | 3/2008 | Chang | 455/41.2 |
| 2008/0253317 A1* | 10/2008 | Gercekci et al. | 370/328 |
| 2009/0061841 A1 | 3/2009 | Chaudhri et al. | |
| 2009/0228908 A1 | 9/2009 | Margis et al. | |
| 2010/0060739 A1 | 3/2010 | Salazar | |
| 2010/0297941 A1 | 11/2010 | Doan et al. | |
| 2011/0086631 A1* | 4/2011 | Park et al. | 455/419 |
| 2011/0174926 A1 | 7/2011 | Margis et al. | |
| 2011/0314507 A1* | 12/2011 | Keen et al. | 725/77 |
| 2012/0066722 A1* | 3/2012 | Cheung et al. | 725/62 |

OTHER PUBLICATIONS

Written Opinion of the International Preliminary Examining Authority, PCT International Application No. PCT/US2011/065437, Jan. 22, 2013.

International Preliminary Report on Patentability, International Application No. PCT/US11/65437, May 3, 2013.

Communication with Supplementary European Search Report, European Patent Application No. EP11 85 3378, Feb. 23, 2015.

* cited by examiner

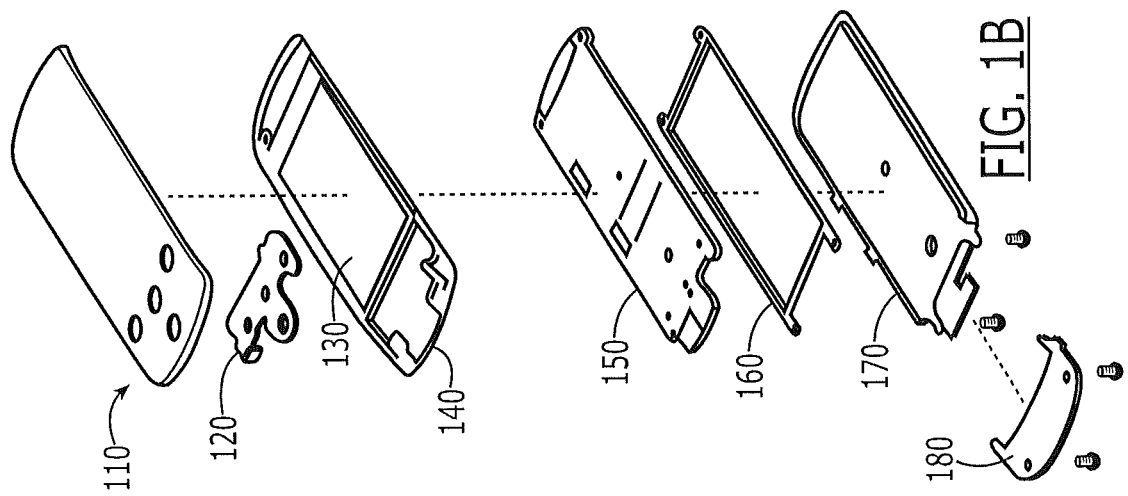
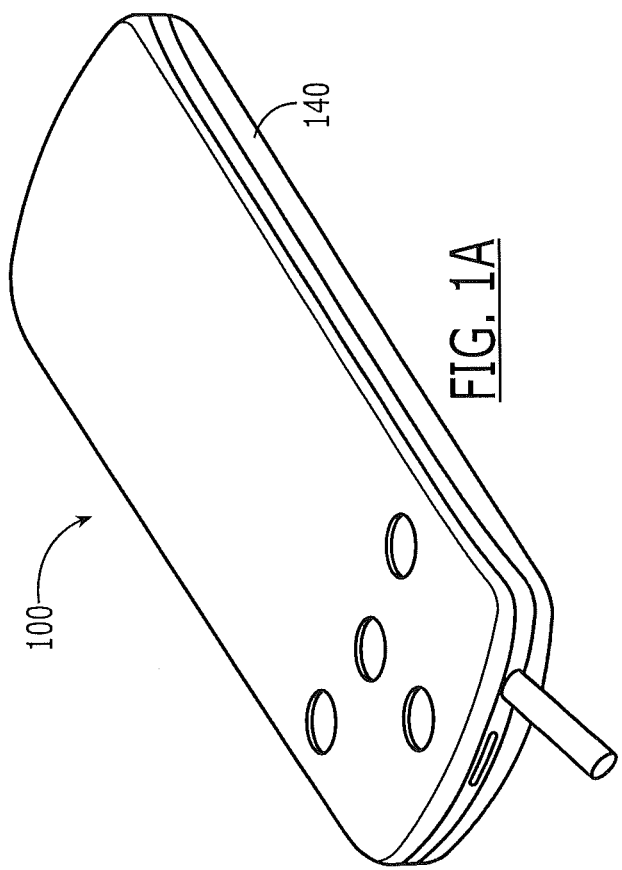

CONTROLLING DISPLAY OF CONTENT ON NETWORKED PASSENGER CONTROLLERS AND VIDEO DISPLAY UNITS

RELATED APPLICATIONS

The present application claims the benefit of priority from U.S. Provisional Application No. 61/427,871 entitled "Programmable Passenger Controller With High Resolution Display and Touch Screen Interface" filed Dec. 29, 2010, the disclosure of which is hereby incorporated herein in its entirety by reference.

TECHNICAL FIELD

The present disclosure relates to electronic entertainment systems and, more particularly, to devices used for remotely controlling entertainment systems.

BACKGROUND

In-flight entertainment (IFE) systems have been deployed onboard aircraft to provide entertainment for passengers in a passenger cabin. The in-flight entertainment systems typically provide passengers with video and audio programming. Some in-flight entertainment systems include an electronic communications network having a head-end server and seat-end electronics boxes that are coupled with video display units located at passenger seats. The video display units display content that is distributed to the seat-end electronics boxes from the head-end server over the communications network. Controllers facilitate a user's control of the content displayed on the video display units. The controllers typically include remote controls for personal use by passengers at their seats in the aircraft.

User interfaces to existing IFE systems may include a touch screen on a dedicated seat display monitor or video display unit disposed at the passenger seat, such as in the seat back in front of the passenger seat. The user interfaces may also include a fixed or tethered remote control unit at a passenger seat that is within reach of the passenger. Remote control units typically include fixed mechanical buttons which provide a variety of functions similar to a typical commercial television remote control. Users manipulate the buttons of the remote control units to produce desired responses at their respective video display units.

The process of using the remote control unit to control the display of the respective video display unit requires users to repetitively shift their focus and attention between the remote control unit and the video display unit, which can be inconvenient and problematic. This shifting of focus may slow the users' interactions with the video display unit and may cause some users discomfort. In addition, the tight command-response relationship between manipulation of a button on the remote control and responsive action displayed on the video display unit typically limits users to performing one activity at a time using the remote control unit. For example, users may only be able to interact with one step of an application process or one change to program content on the video display unit at a time using the remote control, even if the video display unit provides a windowed or overlaid display of more than one content item at a time. In addition, a graphical user interface (GUI), which is overlaid on video content displayed on the video display unit, can block a substantial portion of the video display unit's displayable surface, thus interfering with the passenger's viewing experience.

In a typical configuration, a remote control unit installed at a passenger seat has a fixed set of mechanical buttons or other physical controls, and cannot be expanded or modified without an expensive and time-consuming hardware replacement. Therefore, a user of the remote control is only able to control the display of content on the video display unit using a fixed method allowed by the mechanical buttons and other physical controls included on the remote control unit in conjunction with fixed programming for prompts, etc., provided via the video display unit. For example, a fixed remote control unit may include the following physical controls:

Buttons for audio and video controls for video display unit;
Buttons for navigating graphical user interfaces (GUIs) of video display unit;
Buttons for game control functions associated with video display unit;
Buttons for IFE system services;
Buttons for an alpha-numeric keyboard (e.g., QWERTY keyboard); and
Buttons for remote control of reading light and calling flight attendant The inflexibility of current remote control units severely limits the ability of an IFE system to accommodate passenger and airline needs. For example, an alpha-numeric keyboard cannot be customized for the different languages of its passengers without great expense.

SUMMARY

Some embodiments of the present invention are directed to a controller for controlling an entertainment system that includes a video display unit that is separate from the controller. The controller includes a network interface, a display device, and a processing device. The network interface communicates with the video display unit via at least one data network. The processing device communicates a first command over the at least one data network to control a display of first content on the video display unit, and controls a display of second content on the display device of the controller. The second content is displayed concurrently with the first content.

In a further embodiment, the controller uses near field communications to identify the video display unit which is to be linked to the controller, and then uses the identity to establish a wired network connection to the video display unit.

In a further embodiment, the controller uses near field communications to identify the video display unit which is to be linked to the controller, and then uses the identity to carry out wireless pairing of the controller to the video display unit.

In a further embodiment, the controller establish a lower transmission data rate wireless communication link and a separate higher transmission data rate wireless communication link between the controller and the video display unit. The lower transmission data rate wireless communication link is used to transmit control commands from the controller to the video display unit or vice versa. The higher transmission data rate wireless communication link is used to transmit content from the video display unit to the controller or vice versa.

Some other embodiments of the present invention are directed to an entertainment system for a passenger vehicle that includes a plurality of passenger seats. The entertainment system includes a plurality of passenger controllers, a communication network, and a network address translation router. The passenger controllers are each associated with a different one of the passenger seats. Each of the passenger controllers includes a passenger interface for receiving and outputting information. The communication network communicatively interconnects the passenger controllers. Each of the passenger controllers is assigned a network address that is used for routing information thereto through the communication network. The network address translation router is configured to route a communication packet from an originating one of the passenger controllers through the communication network to a destination one of the passenger controllers by translating between a passenger readable identifier for the destination passenger seat and the network address of the passenger controller associated with the destination passenger seat.

In a further embodiment, the network address translation router is further configured to maintain a routing table that programmatically associates a passenger readable identifier for each of the passenger seats with the network address of the passenger controller associated with the passenger seat. The router receives a phone call and/or a text message via the communication network from the originating passenger controller. The phone call and/or the text message contains the passenger readable identifier for the destination passenger seat. The router queries the routing table using the passenger readable identifier to identify the associated network address for the passenger controller associated with the destination passenger seat, and route the phone call and/or the text message through the communication network to the network address for the passenger controller associated with the destination passenger seat.

Other controllers, systems, and methods according to embodiments of the invention will be or become apparent to one with skill in the art upon review of the following drawings and detailed description. It is intended that all such additional controllers, systems, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 1A shows a perspective view of an assembled example programmable passenger controller according to some embodiments of the present invention;

FIG. 1B shows an exploded perspective view of the example programmable passenger controller of FIG. 1A according to some embodiments of the present invention;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Various embodiments of passenger controllers and entertainment system are described herein which provide benefits over prior systems. For example, some embodiments may provide a flexible entertainment control experience to a passenger that supports multitasking so that the passenger may conduct multiple activities simultaneously using the IFE system. The programmable passenger controller may be easily customizable by the IFE system manufacturer or aircraft operator for different aircraft, customer, and/or passenger requirements. Such customization can include, but is not limited to, changing languages that are used for display of textual information, machine generated speech, and/or machine recognized speech from passengers, and/or cultural customizations as well as other airline operator or flight route customizations. The passenger controller may also facilitate customization of user selectable indicia on a touch screen interface, such as changes to soft button locations/indicia to provide customized touch screen based game controllers which may be automatically reconfigured for use with different game programs that can be selected among by a passenger for execution.

Although various embodiments of the present invention are explained herein in the context an in-flight entertainment environment, embodiments of entertainment systems and related controllers are not limited thereto and may be used in other environments, including other vehicles such as ships, buses, trains, and automobiles, as well as buildings such as conference centers, restaurants, businesses, hotels, homes, etc.

Figure 2A:
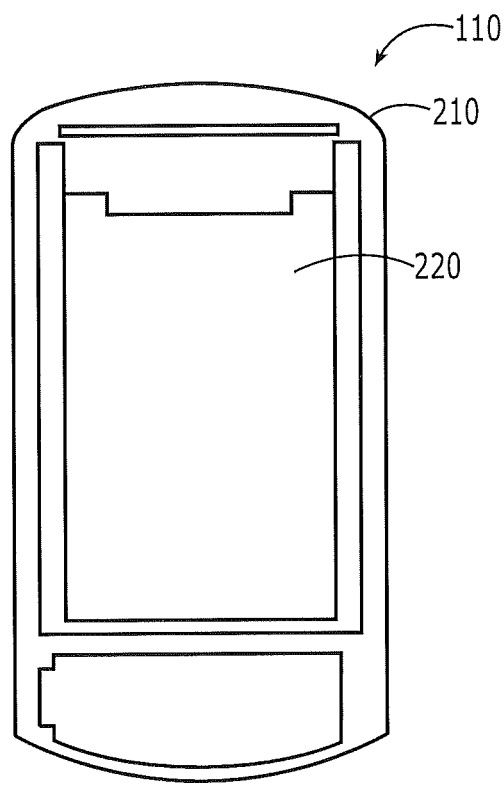
FIGS. 2A and 2B show example interior views of the top cover assembly of the programmable passenger controller of FIGS. 1A and 1B.
Figure 2B:
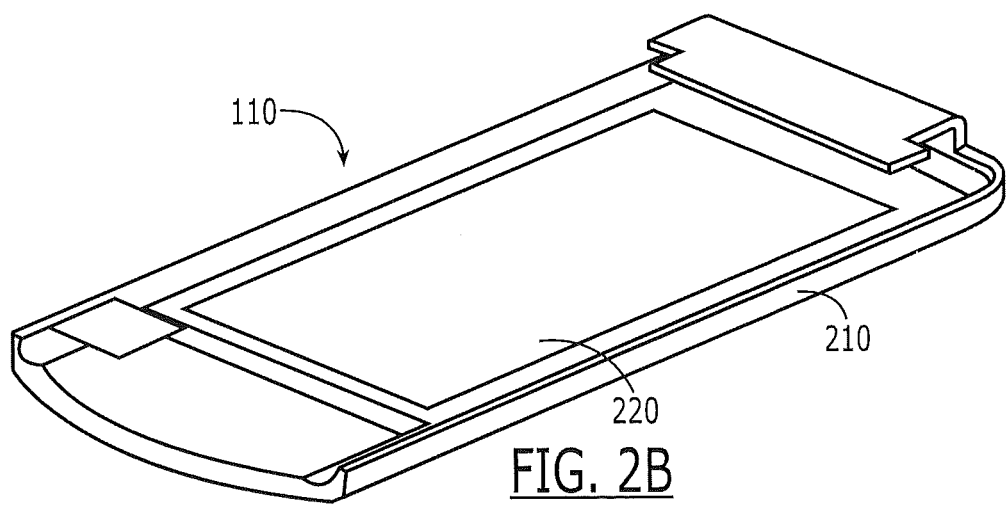

FIG. 1A illustrates a perspective view of an assembled example passenger controller 100. FIG. 1B illustrates the example passenger controller 100 in an exploded perspective view. FIGS. 2A and 2B illustrate interior views of the top cover assembly 110 of the example passenger controller 100 of FIGS. 1A and 1B. Embodiments of the controller 100 may be installed proximate to a passenger seat to which a separate video display unit is also proximately installed. The controller 100 may be installed so as to be handheld while tethered to the aircraft in the vicinity of the passenger seat, such by being tethered to a seat back in front of the passenger seat or to a hand rest adjacent to the passenger seat. The controller 100 may be tethered to its installation location, so that the controller 100 may be held in a passenger's hand in a comfortable and convenient position for viewing and manipulation, while not being removable by the passenger from its installation location.

In other embodiments, the controller 100 may be installed in a fixed position to be adjacent to the video display unit in the seat back in front of the respective passenger seat, in the hand rest adjacent to the respective passenger seat, in a swing-out arm adjacent to the respective passenger seat, or in other configurations. In some embodiments, the controller 100 may not be tethered or fixedly installed, but instead by portable and wirelessly connected to the IFE system. Embodiments of the controller 100 may also be installed in various other locations within an aircraft, such as in common areas such as galleys and lounges. The controller 100 may be automatically locked into a cradle, via a movable solenoid, that is controlled by the controller 100, the SVDU 400, and/or other component to prevent removal during take-off, landing, taxiing, and/or while the aircraft is parked.

In one embodiment, near field communications are used to determine whether the controller 100 has been removed from a cradle or outside a defined range of an associated seating area, and a flight attendant can be notified responsive to that determination. For example, as explained below, the controller 100 may be paired to a near field communication transceiver (e.g., RFID transceiver or Bluetooth transceiver) associated with the cradle and/or the SVDU 400 to form a near field communication link therebetween. The controller 100 and/or the paired SVDU 400/cradle can detect loss of the near field communication link and communicate a responsive alert message to an alert panel monitored by a flight attendant. The flight attendant can thereby be notified when, for example, a controller 100 is not properly stored (e.g., cradled) during takeoff, landing, and/or taxiing of an aircraft, and/or when a controller 100 is being carried off the aircraft.

The controller 100 may include a number of components, some of which are illustrated in FIGS. 1A, 1B, 2A, and 2B. The components of the controller 100 and arrangement thereof portrayed in FIGS. 1A, 1B, 2A, and 2B are not to be construed as limiting, but are to be considered exemplary to illustrate some embodiments of the invention. In various embodiments, some of the illustrated components may not be present and/or additional components may be additionally included to provide additional features and/or operation in view of the present disclosure. For example, while touch screen displays (touch sensitive displays) are discussed with reference to the figures, in some embodiments the controllers may not include touch screens, and other technologies besides touch screen technology may be used to provide input to the controller 100.

The controller 100 illustrated in FIGS. 1A and 1B includes a top cover assembly 110, a keypad 120, a liquid crystal display (LCD) 130, a mid-frame 140, a printed circuit board assembly (PCBA) 150, an electromagnetic interference (EMI) shield 160, a bottom cover 170, and an access door 180. As illustrated in FIGS. 2A and 2B, the top cover assembly 110 includes a decorative cover 210 and a touch screen 220 installed on an underside thereof to cover the LCD 130. The keypad 120 provides physical keys or buttons which a user may press to provide input to the IFE system using the controller 100. The keypad 120 may provide a tactile feedback to the user. The functionality associated with the keys or buttons of the keypad 120 may provide programmatically reconfigurable functionality. The LCD 130 may be a high resolution color display that measures approximately 3.8 inches diagonally with 800×480 pixels, but may be larger or smaller with a different number of pixels in other embodiments as known in the art. The LCD 130 may provide a display of video content including soft buttons or programmable controls which a user may touch select using the touch screen 220 to provide input to the IFE system using the controller 100.

The mid-frame 140 may provide structural integrity to the controller 100. In the illustrated embodiment, the mid-frame 140 may be aluminum (providing an advantageous balance of low cost and light weight). Other materials that may be used for the mid-frame 140 can include a plastic material, a ceramic material, or another material appropriate and useful in an aircraft environment.

The PCBA 150 may include electronic circuits such as a processor, memory, data bus, data communications circuitry, display driver circuitry, audio I/O circuitry, accelerometer, haptic vibration motors, and other circuitry as appropriate to perform the functions of the controller 100. The EMI shield 160 may shield electromagnetic interference from emanating from the PCBA 150 in the controller 100. The decorative cover 210 and the bottom cover 170 may provide a decorative appearance, comfortable gripping surface, and protection of the interior components of the controller 100. The access door 180 may facilitate easy access to interior components (some of which may not be shown) of the controller 100, such as one or more batteries, switches, maintenance port, and/or removable media storage (e.g., a memory card such as a Secure Digital card).

The mid-frame 140 provides mechanical stability and protection for the LCD 130. The controller 100 may be equipped with a LCD 130 that is as large as will fit within its size envelope, which may be regulated by industry standards, such as ARINC 809-1 "3GCN (3rd Generation Cabin Network) Seat Distribution System" which defines the electrical and mechanical interfaces of in-flight entertainment system equipment for the $3^{rd}$ generation cabin network (ARINC Inc., 2551 Riva Road, Annapolis, Md., http://www.arinc.com). The mid-frame 140 protects the controller 100 and the LCD 130 from passenger abuse such as twisting, applying excessive pressure, dropping, etc. The mid-frame 140 provides a thin yet strong wall surrounding the edges of the LCD 130 to facilitate a large viewable surface area.

The touch screen 220 may incorporate a projected capacitive multi-touch screen embedded within or laminated on an underside of the decorative cover 210. In this way, the controller 100 may be constructed to have a thin profile with a sleek appearance. The capacitive touch screen surface of the touch screen 220 may generate a signal indicating a position or x-y coordinate of a passenger's touch on the touch screen 220, and optionally a field strength of the passenger's touch. The signal indicating the position may be used to generate a control signal used to control a video source of the LCD 130 or a respective video display unit of the IFE system with which the controller 100 is operatively associated. The controller 100 may recognize one or more simultaneous touches input by a passenger on the touch screen 220, and may recognize changes in their positions over time. Based on these one or more simultaneous touches, the controller 100 may recognize various gestures such as taps, swipes, strokes, flicks, and pinches, and may perform functions associated with these gestures, such as scrolling screens of data, zooming, selecting menu items, etc.

A touch sensitivity of the capacitive touch technology of the touch screen 220 may be adjusted to compensate for a thickness of a transparent or translucent portion of the decorative cover 210 over the touch screen 220, which may include a material such as polarized glass or plastic. For example, the portion of the decorative cover 210 covering the touch screen 220 may include materials, compositions, and construction characteristics to provide a bright and clear display of the LCD 130 to a user. The portion of the decorative cover 210 may include a reflective mirror surface which passengers may use as a personal mirror for viewing themselves when the LCD 130 is turned off or dark. The reflective mirror surface may include materials, compositions, and construction characteristics to avoid excessive glare to the passenger.

Figure 3A:
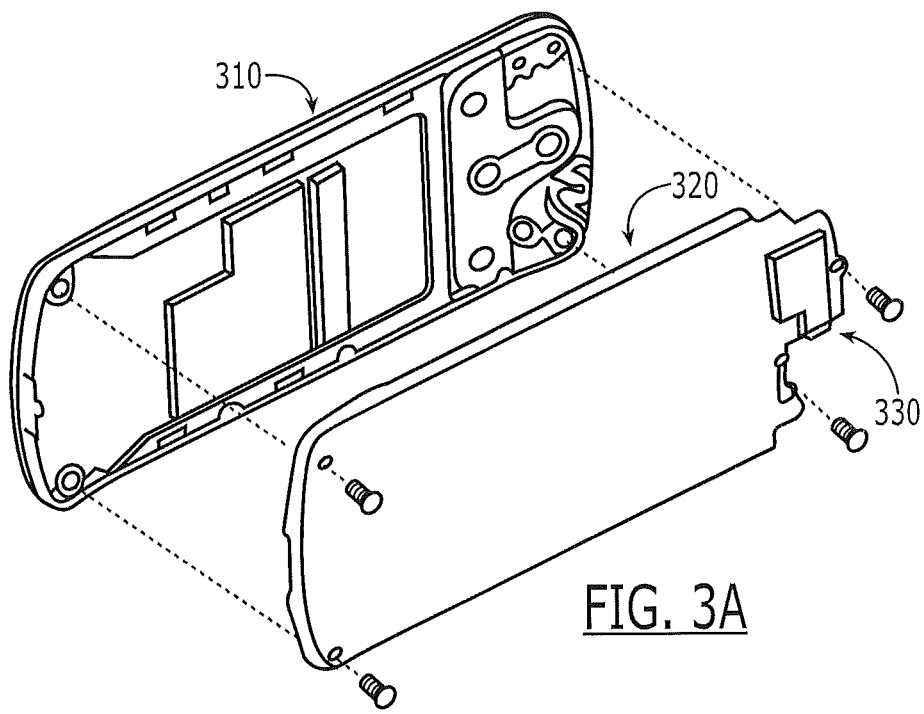
FIGS. 3A and 3B show example front and rear perspective views, respectively, of the passenger controller of FIGS. 1A and 1B assembled into a front cover assembly and a rear cover assembly.
Figure 3B:
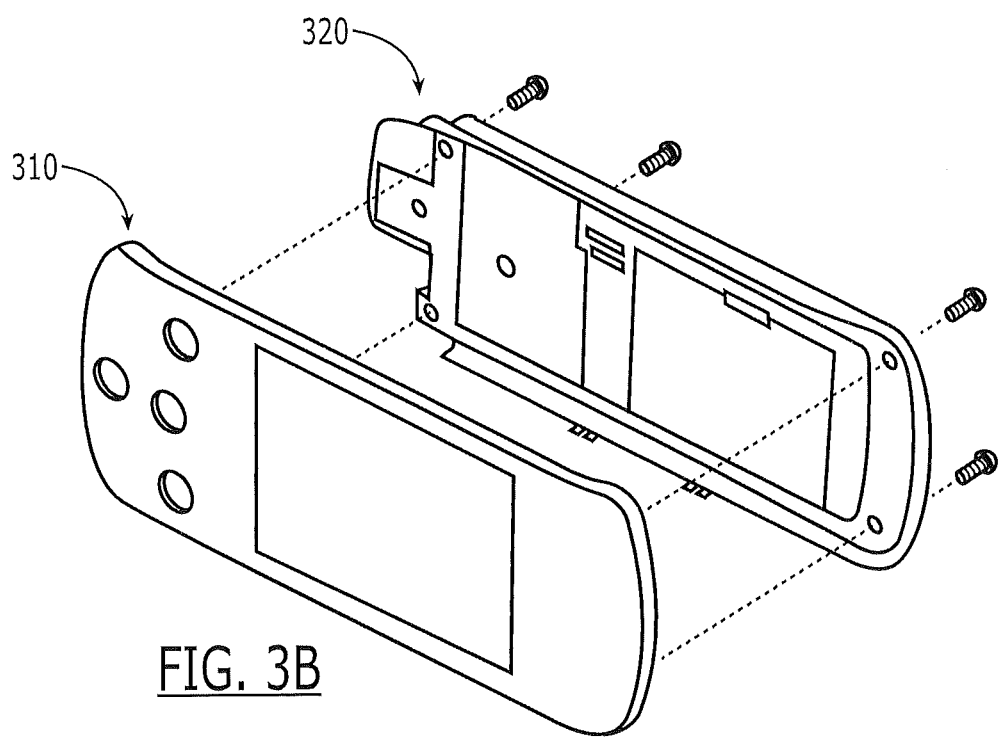

FIGS. 3A and 3B illustrate front and rear perspective views, respectively, of the controller 100 assembled into a front cover assembly 310 and a rear cover assembly 320. The front cover assembly 310 includes the top cover assembly 110, the keypad 120, the LCD 130, and the mid-frame 140. The rear cover assembly 320 includes the PCBA 150, the EMI shield 160, the bottom cover 170, the access door 180 (not shown), and a local memory assembly 330. The local memory assembly 330 may include the removable media storage. This arrangement of parts into the top cover assembly 310 and the rear cover assembly 320 should not be construed as limiting, however, as the partitioning of parts into assemblies may be different in various embodiments.

Figures 4, 5:
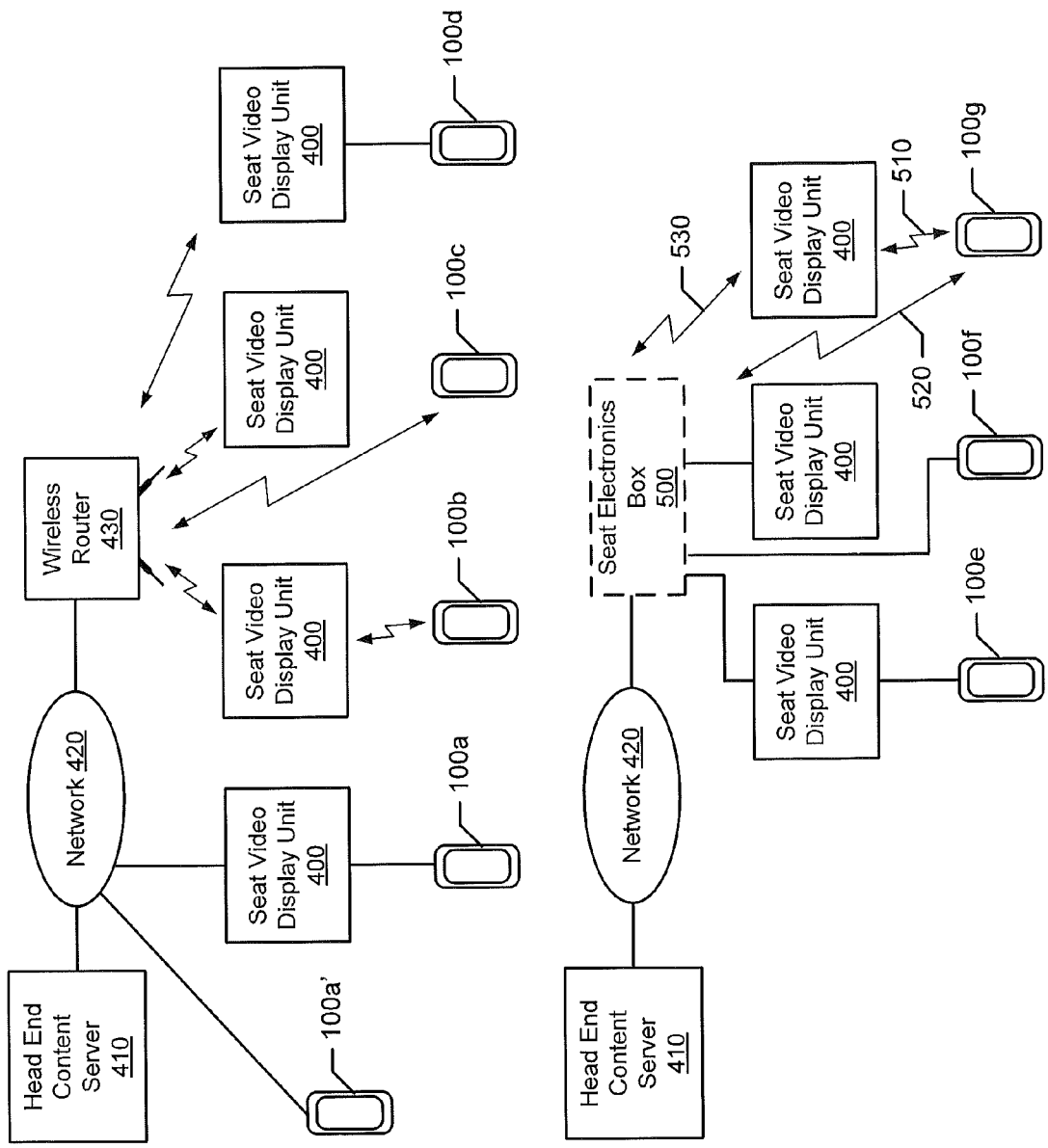
FIG. 4 is a block diagram of an entertainment system that includes passenger controllers and other system components which are configured according to some embodiments of the present invention.
FIG. 5 is a block diagram of another entertainment system that includes passenger controllers and other system components which are configured according to some embodiments of the present invention.

Example Entertainment Systems Having Wireless and Wired Connections Between Passenger Controller and Other Components FIG. 4 is a block diagram of an entertainment system that includes passenger controllers 100a-d, seat video display units (SVDUs) 400a-d, and other system components which are configured according to some embodiments of the present invention. Referring to FIG. 4, the system includes a head end content server 410 that can contains content that can be downloaded to the SVDU 400a-d and passenger controllers 100a-d through a data network 420 and/or a wireless router 430. Example content that can be downloaded from the head end content server 410 can include, but is not limited to, movies, TV shows, other video, audio programming, and application programs (e.g. game programs). The data network 420 may be a packet network (e.g., Ethernet), and wireless router 430 may be a WLAN (e.g. IEEE 802.11, WIMAX, etc) and/or a cellular-based network (e.g. a pico cell).

When used in an aircraft environment, the SVDU 400a-d can be attached to seatbacks so that they face passengers in a following row of seats. As explained above, the passenger controllers 100a-d may, for example, be tethered by a cable (e.g. wire/communication cable) to an armrest or an associated SVDU, or may be untethered. Although some embodiments are described herein in the context of a controller that communicates with a seat video display unit, the controller is not limited to communicating with a seat video display unit and may be used with any separate video display unit.

The passenger controllers 100a-d are communicatively connected through wireless and/or wired communication links to different SVDUs 400a-d. For example, the controller 100a is connected by a wired communication cable (e.g. serial communication cable) to the SVDU 400a which, in turn, is connected to the head end content server 410 through a wired communication cable connected to the network 420. The controller 100b is wirelessly connected through Bluetooth, WLAN, and/or other wireless communication interface directly to the SVDU 400b. The controller 100c is indirectly connected to the SVDU 400c through the wireless router 430. The controller 100d is connected by another wired communication cable to the SVDU 400d. The SVDUs 400b, c,d are connected to the head end content server 410 by a wireless link through the wireless router 430. One or more of the controllers 100 may be connected directly to the network 420 by a wired connection, such as shown for controller 100a'.

In accordance with some embodiments, a passenger can operate a controller 100 to control what content is displayed and/or how the content is displayed on the associated SVDU 400 and/or the controller 100. For example, passenger can operate the controller 100 to select among movies, games, audio program, and/or television shows that are listed on the SVDU 400, and can cause a selected movie/game/audio program/television show to be played on the SVDU 400, played on the controller 100, or played on a combination of the SVDU 400 and the controller 100 (e.g., concurrent display on separate screens).

FIG. 5 is a block diagram of another entertainment system that includes seat electronics boxes 500 that can be distributed within aircraft to interconnect the head end content server 410 to the SVDUs 400e-g and/or the passenger controllers 100e-g. For example, the seat electronics box 500 can be configured to route media from the head end content server 410 to selected ones of the SVDUs 400e-g and/or the passenger controllers 100e-g, and to relay commands (e.g., media selection commands, media playback commands, etc.) from the SVDUs 400e-g and/or the passenger controllers 100e-g to the head end content server 410.

The passenger controllers 100e-g are communicatively connected through wireless and/or wired communication links to different SVDUs 400e-g. For example, the controller 100e is connected by a wired communication cable (e.g. serial communication cable) to the SVDU 400e which, in turn, is connected to the head end content server 410 through a wired communication cable connected to the seat electronics box 500. The controller 100f is indirectly connected to the SVDU 400f by a wired connection through the seat electronics box 500. The controller 100g is indirectly connected to the SVDU 400 through a wireless connection (e.g., Bluetooth, WLAN, etc.) through the seat electronics box 500. One or more of the SVDUs 400 may be connected to the seat electronics box 500 using one or more of the wireless communication interfaces 530 disclosed herein.

Each controller 100 in the IFE system may be assigned a unique network address (e.g., media access control (MAC) address, Ethernet address). In addition, each SVDU 400 may be each assigned a unique network address (e.g., MAC address, Ethernet address) which are different from the respective controller 100 network addresses. In some embodiments, the controller 100 and the respective SVDU 400 may be coupled with a same seat-end electronics box 500 (when utilized by the system) that functions as a local network switch or node to provide network services to a group of passenger seats, for example a row of seats. In other embodiments, the controller 100 and the respective SVDU 400 may be coupled with different seat-end electronics boxes 500 (when utilized by the system). For example, a controller 100 for use by a passenger in an aircraft seat identified by a passenger readable identifier (e.g., a printed placard) as seat "14B" may be attached to a seat electronics box 500 that provides network connections to row "14", while the SVDU 400 installed in the seat back in front of seat "14B" for use by the passenger in seat "14B" may be attached to a different seat electronics box 500 that provides network connections to row "13."

Example Passenger Controller

Figure 6:
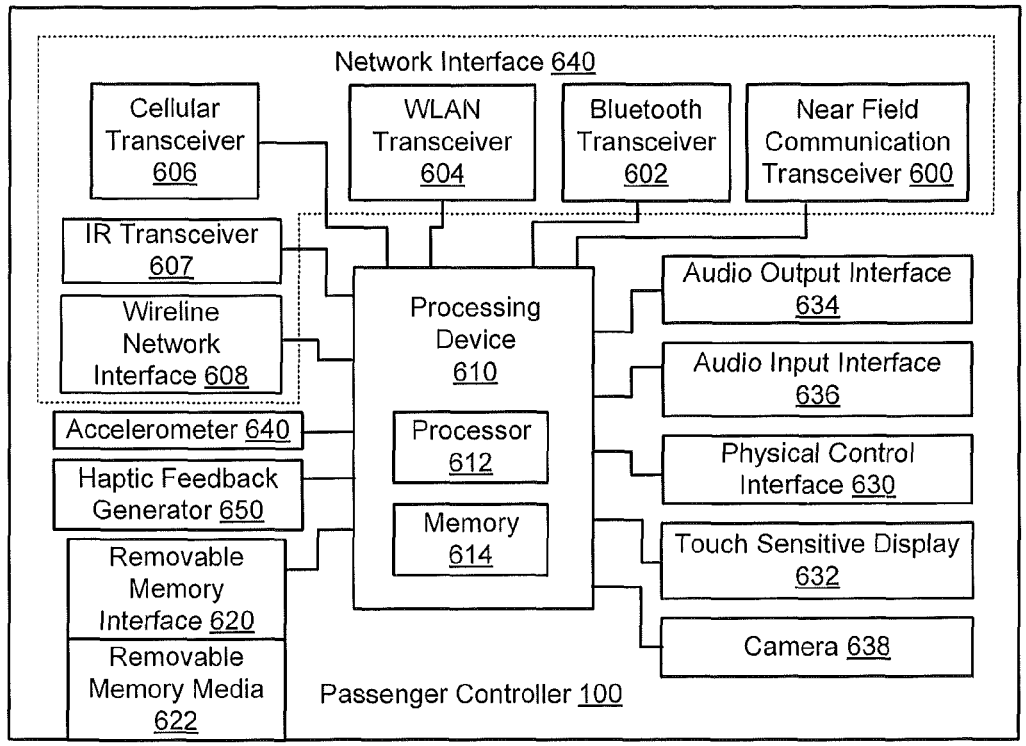
FIG. 6 is a block diagram of a passenger controller that is configured according to some embodiments of the present invention.

FIG. 6 is a functional circuit block diagram of a passenger controller 100 configured according to some embodiments of the present invention. The controller 100 includes a network interface 640, a display device 632, and a processing device

610. The network interface is configured to communicate with a video display unit, such as the SVDU 400 of FIGS. 4 and 5 via at least one data network through a wired or wireless interface.

The display device 632 may include the touch screen 220 and LCD 130 of FIGS. 1-3 to provide a touch sensitive display 632. The processing device 610 may be connected to a camera 638 to receive a stream of images of a passenger, and may be configured to identify gestures that a passenger creates based on an orientation and/or relative positioning of fingers of a hand, placement of hands and/or arms, and/or facial gestures created by the passenger's mouth and/or eyes.

The processing device 610 may include one or more data processors 612, such as a general purpose and/or special purpose processor (e.g., microprocessor and/or digital signal processor), and memory 614. The processor 612 is configured to execute computer program instructions from the memory 614, described below as a computer readable media, to perform at least some of the operations and methods described herein as being performed by a passenger controller in accordance with one or more embodiments of the present invention.

The processor 612 may execute a standard operating system for mobile devices, handheld computing devices, tablet computing devices, or personal digital assistants such as the ANDROID operating system. As such, the processor 612 may be compatible with and execute a wide variety of standard applications available for the operating system, independent of the IFE system and the respective proximately installed SVDU 400. In addition, standard off-the-shelf development platforms available for the standard operating system may facilitate rapid and straightforward application development by the aircraft operator for deployment on the controller 100. In this way, changes to the look and feel or additions to the functionality of the IFE system may be accomplished with reduced effort without requiring any changes to the hardware or recertification of the IFE system. Furthermore, the aircraft operator and/or users may download and install any of the thousands of applications available on the internet or the ANDROID MARKETPLACE for implementation, testing, integration, and use onboard the aircraft by the controllers 100 and the SVDUs 400.

Although the example controller 100 show in FIGS. 1-3 may have a general form factor and touch screen functionality that is similar to a smart phone, it is not limited thereto. Other example embodiments of a controller 100 can include, but are not limited to, a tablet computer, a palmtop computer, and a laptop computer.

The controller 100 may further include audio output/input interfaces 634, 636, a physical control interface 630 (e.g., buttons 120 shown in FIG. 1), an accelerometer 640 that provides an output signal indicating movement and/or orientation of the controller 100, and a haptic feedback generator 650 that generates touch based signaling (e.g., vibration) to a passenger.

In one embodiment, the processing device 610 is configured to respond to user input by communicating commands to the associated SVDU 400 to control the display of content (e.g., movies/television programming, application programs, etc.) on the associated SVDU 400, and to control the display of information received from the head end content server 410 and/or received from the associated SVDU 400 on the display device 632 of the controller 100. As explained above, content can be concurrently displayed on the controller 100 and the associated SVDU 400.

The controller 100 and the associated SVDU 400 may communicate through a wired and/or wireless interface. With further reference to FIG. 6, the network interface 640 can include a near field transceiver 600 (e.g., RFID), a Bluetooth transceiver 602, a WLAN transceiver (e.g., WIFI) 604, a cellular transceiver 606, and/or an IR (infrared) transceiver 607 that is configured to communicate with a corresponding remote wireless transceiver associated with the SVDU 400. The network interface 640 may include other types of wireless transceivers, including Wireless USB, Ultra Wideband (UWB), and optical transceivers such as infrared. The network interface 640 may include a wireline network interface 608 (e.g., Ethernet, Universal Serial Bus (USB)) that is configured to communicate with the SVDU 400 via a wired data network.

In one embodiment, the controller 100 may be configured to use the near field transceiver 600 to receive payment information from a credit card, and to communicate off-plane (e.g., as described below regarding FIG. 10) to a credit card processing facility to process payment information for a financial transaction performed on the plane.

In various embodiments, the controller 100 may be constructed of appropriate materials to meet applicable aircraft industry standards and requirements. For example, a head impact criteria (HIC) test may be satisfied by the controller 100. The controller 100 may be ideally suited for extreme environments such as that of an aircraft. These extreme environments may include vibration, large temperature variations, and shock which may cause reliability problems with standard commercial grade entertainment system controllers.

The functionality of the controller 100 as a touch screen interface for controlling the IFE system can facilitate straightforward, inexpensive, and rapid customization and branding of the controller 100 onboard the aircraft. For example, the IFE system manufacturer and/or the aircraft operator (e.g., airline) may customize the passenger interface of the controller 100 and SVDU 400 through software and/or graphical modifications input to the controller 100, and therefore may not requirements replacement of hardware to provide customization.

Moreover, the touch sensitive display 722 of the controller 100 facilitates the passenger's browsing and selection of IFE system functions, applications, and content in an intuitive manner without requiring the passenger to switch focus between the controller 100 and the separate SVDU 400. Furthermore, the passenger may have the option to direct content to the associated SVDU 400 which may be mounted in a seat back in front of the passenger's seat, or direct the content to the touch sensitive display 722 of the controller 100 for more personal viewing, local games, and/or convenient interaction.

In this way, the controller 100 may provide the passenger with an effective dual-screen display in combination with the respective video display unit to facilitate multitasking such as watching a movie while ordering meals and beverages, shopping, checking or sending email, viewing a real-time updating map of the flight's progress, playing a local game, or enjoying other entertainment options.

Using a First Wireless Link to Pair a Controller and a SVDU Across a Wired Network Some embodiments are directed to facilitating establishment of communication links between controllers and SVDUs. In one embodiment, the processing device 610 of a controller 100 uses a wireless communication link to identify a SVDU 400 with which it is to be associated. The processing device 610 then uses the SVDU identity to perform further communications through a wired network with the SVDU 400. The processing device 610 may therefore control the wireless transceiver 600-607 to establish a wireless communication link with the remote wireless transceiver to receive an identifier for the SVDU 400, and then control the wired network interface 608 to use the identifier to communicate a command through the wired data network to control the display of the first content on the SVDU 400.

In one embodiment, the controller 100 may be associated with a particular SVDU 400 by swiping the controller 100 across a RFID tag that is located on (or otherwise associated with) the SVDU 400 to cause transmission of an identifier of the SVDU 400 from the RFID tag to the controller 100, which can occur without performing pairing operations between the near field transceiver 600 and the RFID tag and without the associated steps required of an operator/passenger.

In a further embodiment, the wireless transceiver can include a near field transceiver 600 that is configured to communicate with a remote near field transceiver associated with the SVDU 400. The processing device 610 can control the near field transceiver 600 to establish the communication link with the remote near field transceiver to receive the identifier for the SVDU 400 without performing pairing of the near field transceiver 600 and the remote near field transceiver. The processing device 610 can then use the identifier as a network address for the SVDU 400, or can determine a network address for the SVDU 400 using the identifier, to enable communication of command through the wired network to control the display of content on the associated SVDU 400.
Using a First Wireless Link to Pair a Controller and SVDU across a Second Wireless Link In another embodiment, the controller 100 uses the near field transceiver 600 as described above to receive an identifier for a particular SVDU 400 (e.g. by swiping the near field transceiver 600 by a RFID tag associated with the SVDU 400) without performing pairing of the first wireless transceiver and the remote first wireless transceiver. The processing device 610 then controls a selected other one of the transceivers, such as the Bluetooth transceiver 602, the WLAN transceiver 604, and/or the cellular transceiver 606 to use the identifier to perform pairing to a corresponding remote transceiver (i.e., Bluetooth transceiver, WLAN transceiver, and/or cellular transceiver) of the SVDU 400 to establish a second communication link with the remote transceiver. The processing device 610 communicates commands through the selected transceiver to control the display of content of the SVDU 400, to control the delivery of content from the SVDU 400 to the controller 100, and/or to control the delivery of content from the head end content server 410 to the controller 100 and/or to the SVDU 400.

In a further embodiment, the processing device 610 controls the Bluetooth transceiver 602 to use the identifier to perform pairing to a remote Bluetooth transceiver of the SVDU 400 to establish a Bluetooth communication link, and to then control the SVDU 400 and/or the head end content server 410 through the Bluetooth communication link.

Figure 8:
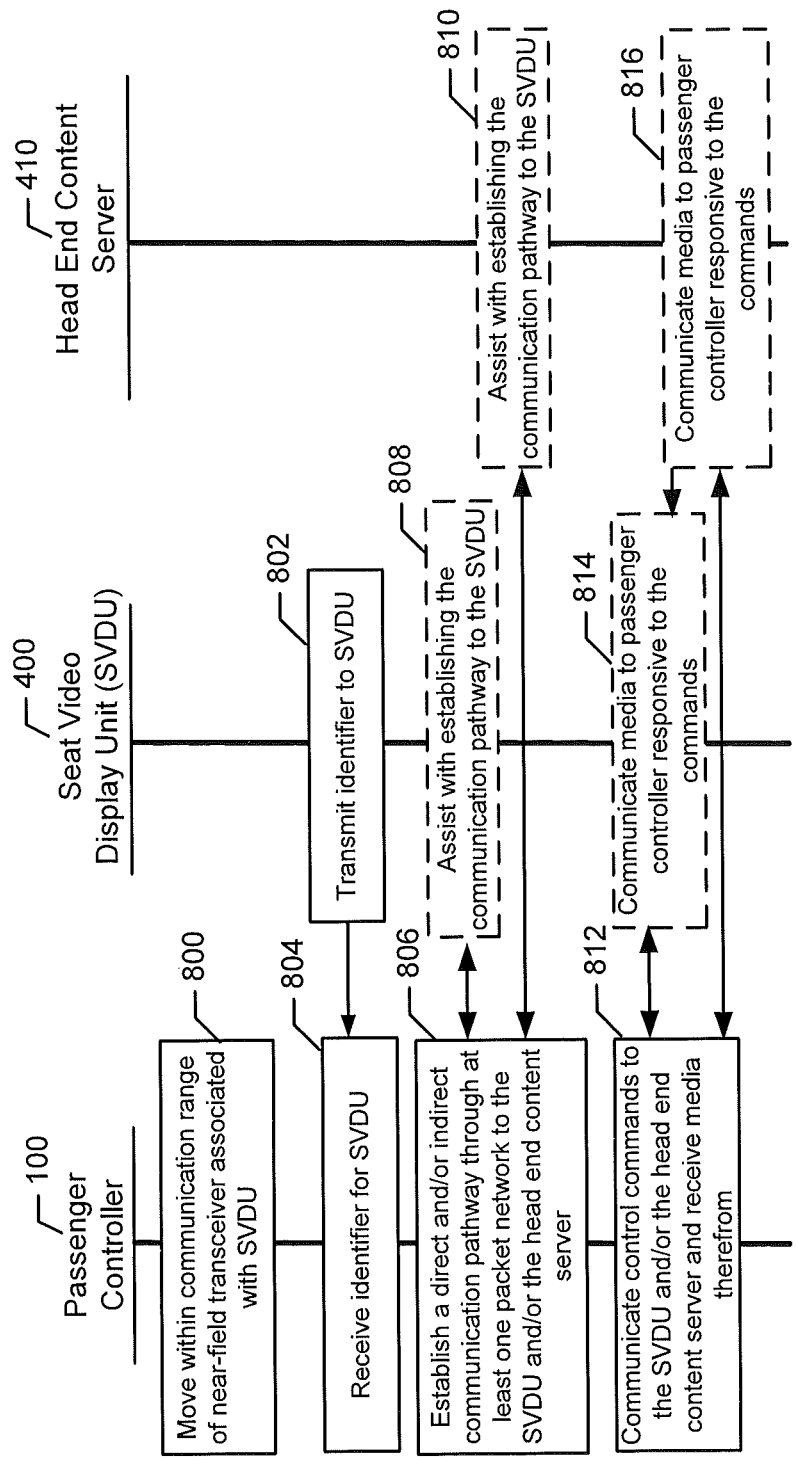
FIG. 8 is a combined data flow diagram and flowchart of operations and methods that establish communication pathways between various components of an entertainment system according to some embodiments of the present invention.
Figure 9:
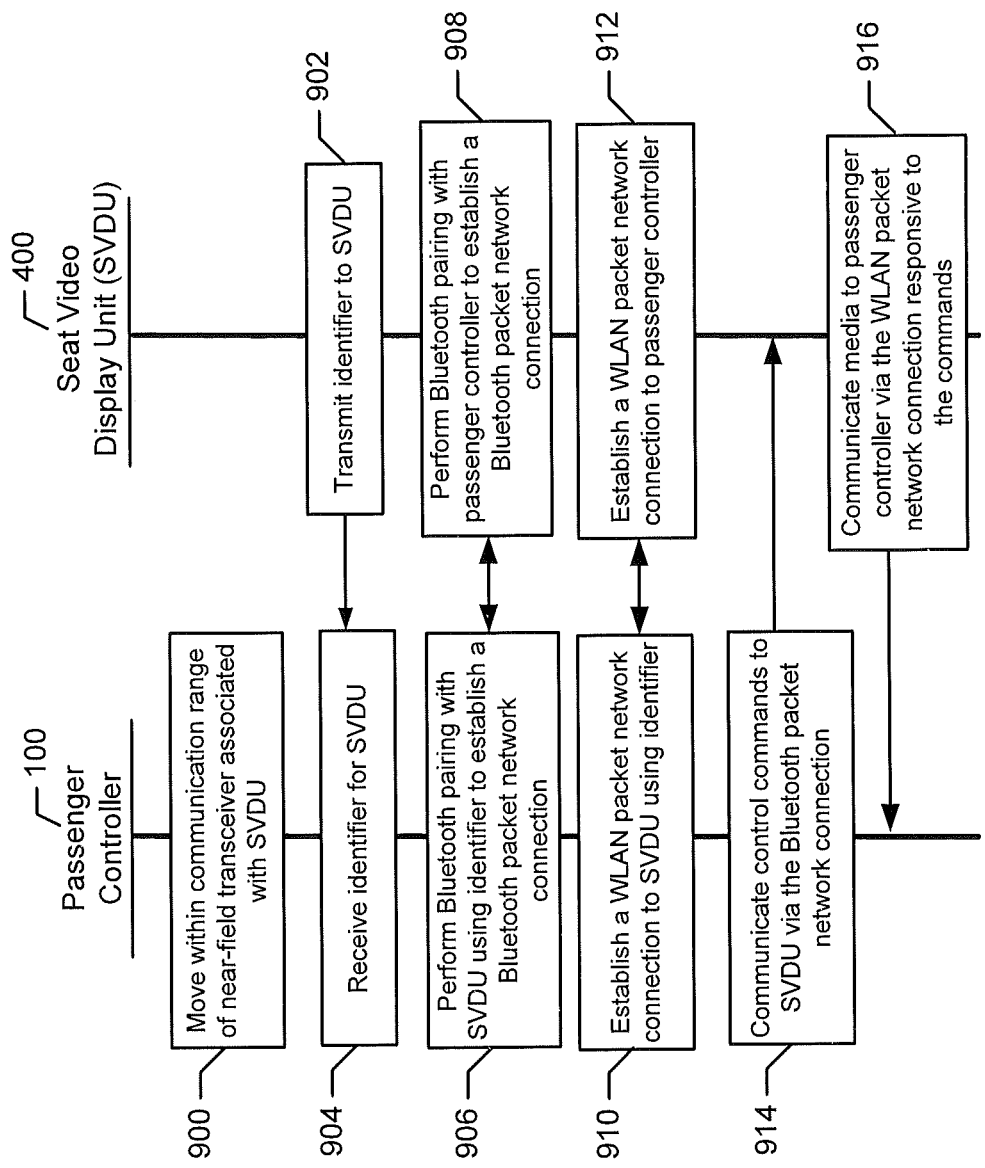
FIG. 9 is a combined data flow diagram and flowchart of further operations and methods that establish communication pathways between various components of an entertainment system according to some embodiments of the present invention.

In another further embodiment, the processing device 610 controls the WLAN transceiver 604 to use the identifier to perform pairing to a WLAN transceiver of the wireless router 430, and establish a communication link through the wireless router 430 to the SVDU 400. The processing device 610 can then control the SVDU 400 and/or the head end content server 410 through the WLAN communication link.
Further Operations for Pairing a Controller and SVDU Example operations and data flows that may be carried out between a controller 100 and a SVDU 400 are shown in FIGS. 8 and 9. Referring to a first embodiment shown in FIG. 8, an operator (e.g., maintenance person) or passenger can move (block 800) the controller 100 within a communication range of a near field transceiver associated with the SVDU 400. For example, the controller 100 can be swiped past a RFID tag associated with the SVDU 400 and/or can be moved within range of a Bluetooth transceiver and/or another communication transceiver of the SVDU 400. The near field transceiver of the SVDU 400 can transmit (block 802) the identifier for the SVDU for receipt (block 804) by the near field transceiver of the controller 100. The controller 100 can then establish (block 806) a direct and/or indirect communication pathway through at least one packet network (e.g. wired and/or wireless network) to the SVDU 400 and/or to the head end content server 410. The SVDU 400 and/or to the head end content server 410 can perform operations to assist (blocks 808 and 810) with establish and communication pathway to the controller 100.

The controller 100 can then communicate (block 812) control commands to the SVDU 400 and/or to the head end content server 410 to control the display of content on the SVDU 400 and/or to control the delivery of content from the SVDU 400 and/or the head end content server 410 to the controller 100. The SVDU 400 can therefore respond to commands form the controller 100 by communicating (block 814) content (e.g., a selected movie, television program, and/or application program) to the controller 100. The head end content server 410 can similarly respond to commands originating from the controller 100 by communicating (block 816) content (e.g., a selected movie, television program, and/or application program) to the controller 100 and/or to the SVDU 400.
Using Dissimilar Data Rate Wireless Links for Control and Content Communications FIG. 9 illustrates operations and methods according to a further embodiment that is directed to using RFID communications (one type of near field communications) to communicate the identifier for the SVDU 400, and then using the identifier to establish a lower transmission data rate wireless communication link (e.g., Bluetooth) and a separate higher transmission data rate wireless communication link (e.g., WLAN) between the controller 100 and the SVDU 400. The lower transmission data rate wireless communication link can be used to communicate control commands, and may be exclusively used to communicate control commands. The higher transmission data rate wireless communication link can be used to communicate content (e.g., movie, television program, and/or application program), and may be exclusively used to communicate content.

Referring to FIG. 9, the controller 100 is moved (block 900) within a communication range of a RFID transceiver associated with the SVDU 400. The RFID transceiver of the SVDU 400 transmits (block 902) the identifier for receipt (block 904) by the RFID transceiver of the controller 100. The controller 100 performs Bluetooth pairing (blocks 906 and 908) with a Bluetooth transceiver of the SVDU 400 using the identifier to establish a Bluetooth network connection (block 906). The controller 100 also establishes (blocks 910 and 912) a WLAN network connection to a WLAN transceiver of the SVDU 400 using the identifier.

In a further embodiment, the controller 100 communicates (block 914) control commands to the SVDU 400 through the Bluetooth network connection to control the display of content (e.g., a selected movie, television program, and/or application program) on the SVDU 400 and/or to control the delivery of content from the SVDU 400 and/or the head end content server 410 to the controller 100. The SVDU 400 can communicate (block 916) content to the controller 100 through the WLAN network connection responsive to the control commands.

For example, a passenger can operate the controller 100 to generate a command that is used to select among a list of movies displayed on a display of the SVDU 400. The controller 100 can transmit the command through the Bluetooth network connection to cause the SVDU 400 to select a movie that is to be played on the display of the SVDU 400. The passenger may alternatively or additionally indicate by the generated command that the selected movie is to be streamed through the WLAN network connection for display on the display 632 of the controller 100. Other example commands that the passenger can generate from the controller 100 to control operation of the SVDU 400 can include gaming control feedback that is provided to a game program executing on the SVDU 400 and/or to cause video output to be played on the SVDU 400, streamed to the controller 100 for playing, or played on both the SVDU 400 and the controller 100. Other commands can include starting, pausing, and/or stopping playback of a movie and/or television program that is selectively (responsive to the command(s)) played on the SVDU 400, streamed to the controller 100 for playing, or played on both the SVDU 400 and the controller 100

The passenger can similarly use the controller 100 to generate commands that cause different content to be displayed on the SVDU 400 and the controller 100. For example, a passenger may operate the controller 100 to play a movie on the SVDU 400 and cause a game program to be downloaded from the SVDU 400 through the WLAN network connection for execution on the controller 100, so that playing of the movie and execution of the game program are occurring concurrently.

Repair and Reconfiguration of the Controller

By partitioning the controller 100 into multiple subassemblies such as the front cover assembly 310 and the rear cover assembly 320, a broad range of repair and replacement strategies may be employed to reduce the life-cycle costs of the controller 100 when deployed in an aircraft environment. One such strategy includes facilitating repair of a defective or malfunctioning controller 100 "on-wing," at an airport terminal, or at an operator's or airline's local facilities. Replacement modules may be stored on-board the aircraft or at the operator's facilities at an airport for rapid replacement of defective modules onboard the aircraft.

A removable memory media may be swapped out to change content and/or functionality available to users via the controller 100. This swap may be conveniently performed during an on-wing maintenance operation. When a large amount of airline-specific content and/or software functionality is incorporated into the controller 100, loading the content and/or software functionality via a data communications interface can be very time consuming and therefore a limiting factor in the amount of content and/or software functionality that may be loaded at a given time. By having the content and/or software functionality stored on removable memory media, the content and/or software functionality of the controller 100 may be updated simply and quickly by swapping a new removable memory media into the controller 100 in place of an existing removable memory media. In addition, the removable memory media may be removed from the controller 100 when the controller 100 fails and needs to be replaced, and then re-installed or replaced into the replacement controller 100 during an on-wing repair operation.

Referring again to FIG. 6, the controller 100 can include a removable memory interface 620 that is configured to receive a removable memory media 622 and to store and retrieve data on the removable memory media 622. The media 622 includes non-volatile memory, such as flash memory or magnetic memory on a Solid State Disk (SSD), Secure Digital Card (SD Card), or disk drive. The processing device 610 is configured to execute programs residing on the media 622 (e.g., operation system program, game program, application program, etc.) to provide information to a passenger and/or to control interactions (e.g., operation of a graphical user interface) between the passenger and the controller 100. The media 622 can include content, such as movies, television programs, music, and audio programs.

Example Network Node

Figure 7:
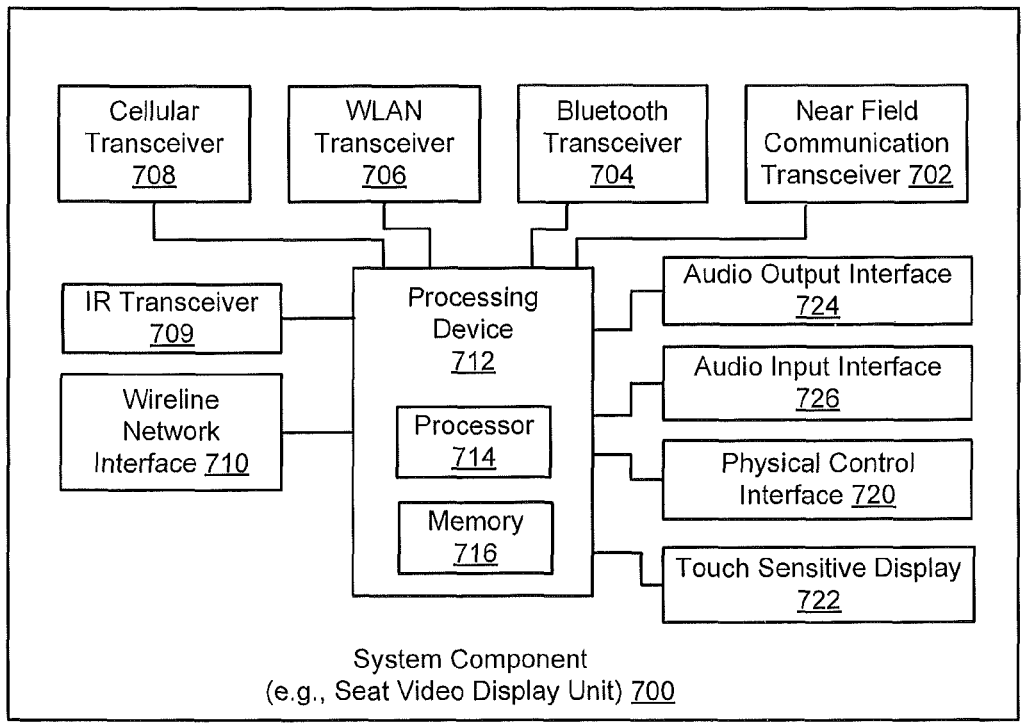
FIG. 7 is a block diagram of a system component that is configured according to some embodiments of the present invention.

FIG. 7 is a functional circuit block diagram of a network node 700 configured according to some embodiments of the present invention, and elements of which may be included in the SVDU 400, the head end content server 400, a network address translation router 1000 (explained below), or other components of an entertainment system. The network node 700 includes a network interface that may include a wireline network interface 710, a near field transceiver 702 (e.g., a RFID transceiver), a Bluetooth transceiver 704, a WLAN transceiver 706, a cellular transceiver 708, and/or an IR transceiver 709 that are configured to communicate with a corresponding network interfaces and/or transceivers described above with regard to the controller 100.

The processing device 712 may include one or more data processors 714, such as a general purpose and/or special purpose processor (e.g., microprocessor and/or digital signal processor), and memory 716. The processor 714 is configured to execute computer program instructions from the memory 716, described below as a computer readable media, to perform at least some of the operations and methods described herein as being performed by the SVDU 400, the head end content server 410, the router 1000, and/or other system components in accordance with one or more embodiments of the present invention.

The controller note 700 may include audio output/input interfaces 724, 726, a physical control interface 720 (e.g., keyboard/keypad/buttons/switches), and a touch sensitive display 722.

Routing Phone Calls and/or Text messages Between Passenger Seats

Some embodiments are directed to routing phone calls and/or text messages between passenger seats. A passenger may call another passenger by entering or selecting a seat identifier for the other passenger using the passenger controller 100 and/or the associated SVDU 400, and can use a headset 1010 to talk to the other passenger. The passenger may perform a video conference with the other passenger using the camera 638 to send video to the other passenger and by receiving video from a controller 100 and/or SVDU 400 operated by the other passenger. A passenger may also call off-plane through a satellite/cellular transceiver 1020. A passenger may additionally or alternative send a text message to the other passenger by entering or selecting a seat identifier for the other passenger and typing the text message using an interface of the controller 100 and/or the SVDU 400 (e.g., a virtual keyboard displayed on the display 632 of the controller and/or a virtual keyboard displayed on the display 722 of the SVDU 400).

In particular, the system enables a passenger to enter or other select a passenger readable identifier (e.g., a printed placard) for a seat that is to receive the phone call and/or the text message (destination passenger seat), and the system translates that identifier into a network address that is used to route the phone call and/or text message to the destination passenger seat.

Figure 10:
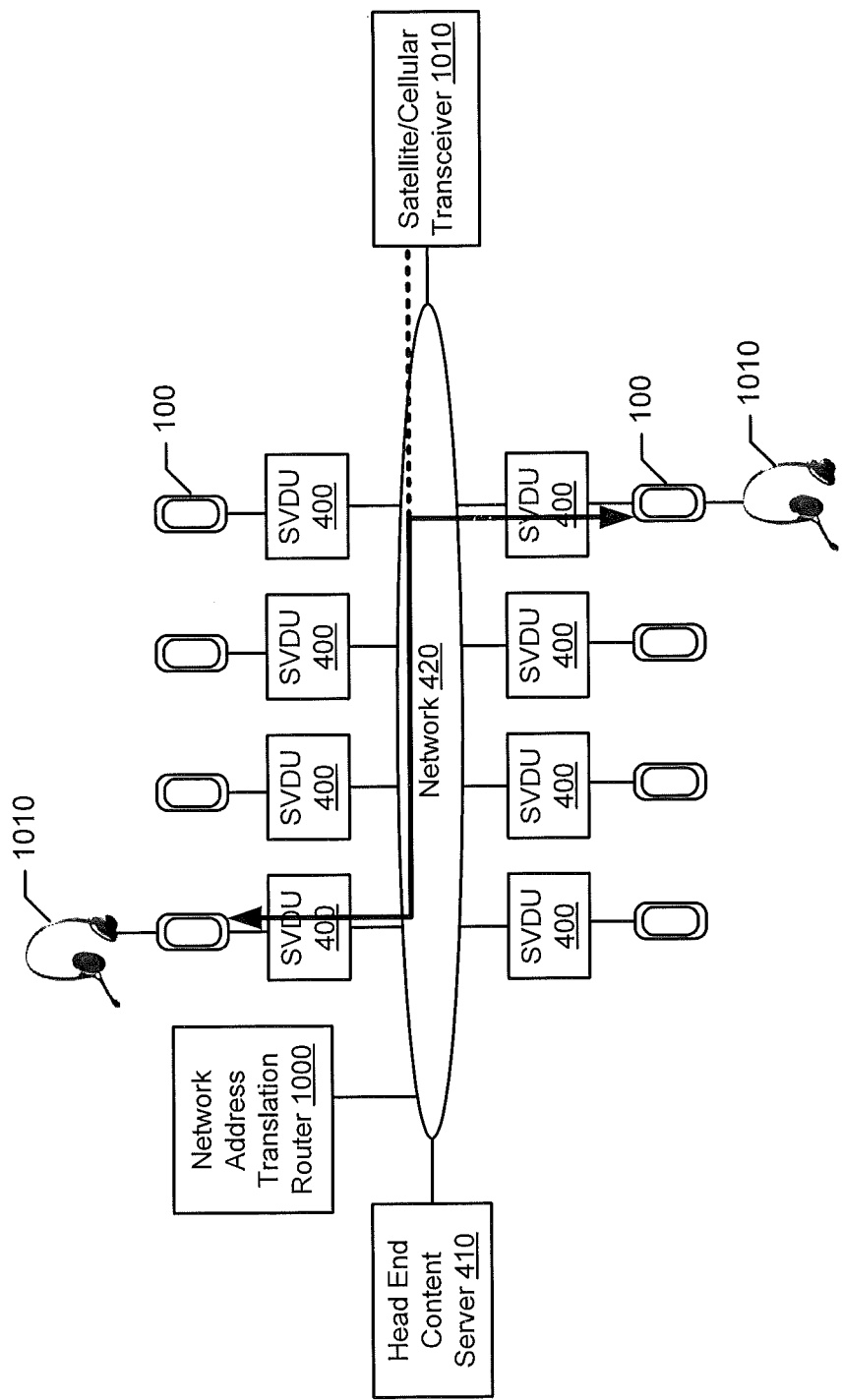
FIG. 10 is a block diagram of another entertainment system that is configured according to some embodiments of the present invention.

These and other embodiments are described below with regard to the example entertainment system shown in FIG. 10. The system includes a plurality of passenger controllers 100 that are each associated with a different one of the passenger seats. A communication network 420 communicatively interconnects the controllers 100. Each of the controllers 100 is assigned a unique network address that is used for routing information thereto through the communication network 420. The controllers 100 may be connected to the network 420 through associated SVDUs 400 as explained above, and the SVDUs 400 can also be assigned unique network addresses.

A network address translation router 1000 is configured to route a communication packet from an originating one of the passenger controllers 100 through the communication network 420 to a destination one of the passenger controllers 100 by translating between a passenger readable identifier for the destination passenger seat (entered or selected by a passenger) (e.g., "2A" to indicate row 2 seat A) and the network address of the passenger controller 100 associated with the destination passenger seat (e.g., "30C" indicating row 30 seat C).

The network address translation router 1000 may maintain a routing table that programmatically associates a passenger readable identifier for each of the passenger seats with the network address of the passenger controller 100 associated with the passenger seat. The router 1000 can be configured to receive a phone call and/or a text message via the communication network 420 from the originating passenger controller 100. The phone call and/or the text message can contain the passenger readable identifier for the destination passenger seat. The router 1000 can respond by querying the routing table using the passenger readable identifier to identify the associated network address for the passenger controller 100 associated with the destination passenger seat. The router 1000 then routes the phone call and/or the text message through the communication network 420 to the network address for the passenger controller 100 associated with the destination passenger seat.

In a further embodiment, the network address translation router 1000 receives an originating network address for the originating passenger controller 100 of the phone call and/or the text message, and queries the routing table using the originating network address to identify the passenger readable identifier for the passenger seat associated with the originating passenger controller 100. The router 1000 then routes the phone call and/or the text message, with information identifying the passenger readable identifier for the passenger seat associated with the originating passenger controller 100, to the network address for the passenger controller 100 associated with the destination passenger seat.

In a further embodiment, each of the passenger controllers 100 is configured to receive a phone call and/or a text message having information identifying a passenger readable identifier for a passenger seat associated with another passenger controller 100 that originated the phone call and/or the text message, and to display the passenger readable identifier for the received phone call and/or text message on the display device 632.

FURTHER DEFINITIONS

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

For the sake of brevity, conventional electronics, systems, and software functional aspects of the systems (and components of the individual operating components of the systems) may not be described in detail. Furthermore, the connecting lines, or connectors shown in the various figures presented are intended to represent example communication/functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

The use of any and all examples, or exemplary language (e.g., "such as") provided herein, is intended merely to better illuminate the invention and does not pose a limitation on the scope of the invention unless otherwise claimed. The use of the terms "a" and "an" and "the" and similar referents in the context of describing the invention (especially in the context of the following claims) are to be construed to cover both the singular and the plural, unless the context unambiguously indicates otherwise. In addition, it should be understood that although the terms "first," "second," etc. may be used herein to describe various elements, these elements should not be limited by these terms, which are only used to distinguish one element from another. The term "and/or", abbreviated "/", includes any and all combinations of one or more of the associated listed items.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable media that can direct a computer or other programmable data processing apparatus to function in a particular manner, such that the instructions stored in the computer-readable media produce an article of manufacture including instructions which implement the functions/acts specified in the block diagrams and/or flowchart block or blocks.

A tangible, non-transitory computer-readable media may include an electronic, magnetic, optical, electromagnetic, or semiconductor data storage system, apparatus, or device. More specific examples of the computer-readable media would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing device to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other controllers, SVDU, systems, and/or methods according to embodiments of the invention will be or become apparent to one with skill in the art upon review of the present drawings and description. It is intended that all such additional controllers, SVDU, systems, and/or methods be included within this description, be within the scope of the present invention, and be protected by the accompanying claims. Moreover, it is intended that all embodiments disclosed herein can be implemented separately or combined in any way and/or combination.

What is claimed:

1. A controller for controlling an entertainment system that includes a video display unit that is separate from the controller, the controller comprising:
    a network interface for communicating with the video display unit via at least one data network, wherein the network interface comprises:
        a first transceiver to communicate with a remote first transceiver connected to the video display unit, wherein the first transceiver and the remote first transceiver are near field transceivers that wirelessly communicate with each other using radio frequency signals, and
        a second transceiver to wirelessly communicate through radio frequency signals with a remote second transceiver connected to the video display unit;
    a display device; and
    a processing device to:
        control the first transceiver to establish a first communication link with the remote first transceiver and receive an identifier for the video display unit without performing pairing of the first transceiver and the remote first transceiver;
        control the second transceiver to use the identifier for the video display unit to perform pairing to the remote second transceiver to establish a second communication link with the remote second transceiver, wherein prior to performing the pairing the processing device cannot transmit a command through the second transceiver to the remote second transceiver and cannot receive content through the second transceiver from the remote second transceiver;
        after performing the pairing, communicate a first command through the second transceiver and the second communication link to the remote second transceiver to control a display of first content on the video display unit;
        after performing the pairing, receive second content through the second transceiver via the second communication link from the remote second transceiver; and
        control a display of the second content on the display device of the controller, wherein the second content is displayed on the display device of the controller concurrently with the first content displayed on the video display unit.

2. The controller of claim 1, wherein:
    the first transceiver reads a RFID tag from a RFID transmitter connected to the video display unit to receive the identifier for the video display unit;

wherein the processing device receives the identifier for the video display unit from the first transceiver and controls pairing by the second transceiver with the remote second transceiver responsive to the identifier for the video display unit.

3. The controller of claim 1, wherein:

the second transceiver comprises a Bluetooth transceiver that is configured to communicates with a remote Bluetooth transceiver connected to the video display unit; and the processing device is configured to:

control the Bluetooth transceiver to use the identifier for the video display unit to perform pairing between the Bluetooth transceiver and the remote Bluetooth transceiver to establish a Bluetooth communication link; and communicate the first command through the Bluetooth transceiver and the Bluetooth communication link to control the display of the first content on the video display unit.

4. The controller of claim 1, wherein:

the second transceiver comprises a wireless local area network transceiver that is configured to communicate with a wireless local area network router that has a communication link to a remote wireless local area network transceiver connected to the video display unit; and the processing device is configured to:

control the wireless local area network transceiver to use the identifier for the video display unit to perform pairing to the wireless local area network router to establish the second communication link through the wireless local area network router to the remote wireless local area network transceiver; and communicate the first command through the wireless local area network transceiver and the second communication link to control the display of the first content on the video display unit.

5. The controller of claim 1, wherein:

the first transceiver transmits at a lower data communication rate than the second transceiver; and the processing device is configured to:

communicate commands received from a user through the first transceiver to control the video display unit; and receive the second content through the second transceiver from the remote second transceiver and display on the display device of the controller.

6. The controller of claim 5, wherein:

the first transceiver comprises a Bluetooth transceiver that is configured to communicate with a remote Bluetooth transceiver connected to the video display unit; and the second transceiver comprises a wireless local area network transceiver that is configured to communicate with a remote wireless local area network transceiver connected to the video display unit.

7. The controller of claim 5, wherein the processing device is configured to:

communicate the first command through the first transceiver to the remote first transceiver to control the video display unit to select a video stream that is communicated to the controller; and receive the selected video stream through the second transceiver from the remote second transceiver and display on the display device of the controller.

8. The controller of claim 7, wherein:

the processing device is configured to communicate the first command through the first transceiver to the remote first transceiver to control the video display unit to start, pause, and/or stop streaming of the selected video stream received through the second transmitter of the controller.

9. The controller of claim 5, wherein:

the processing device is configured to communicate commands through the first transceiver to the remote first transceiver to control operation of a game program that is being executed by a remote processing device of the video display unit.

10. The controller of claim 9, wherein:

the processing device is configured to communicate commands through the first transceiver to the remote first transceiver to cause first video content to be output from the game program and displayed by the video display unit and to further cause second video content to be output from the game program and transmitted from the video display unit through the remote second transceiver and received through the second transceiver for display on the display device of the controller.

11. The controller of claim 1, further comprising a removable memory interface that is configured to receive a removable memory media and to store and retrieve data on the removable memory media, wherein the processing device is configured to control the display of the second content on the display device of the controller responsive to program code that is retrieved from the removable memory media.

12. The controller of claim 11, wherein:

the processing device is configured to execute at least one application program that is stored on the removable memory media to control interaction between the controller and a user.

\* \* \* \* \*